United States Patent
Diepstraten et al.

(10) Patent No.: US 7,987,302 B2
(45) Date of Patent: Jul. 26, 2011

(54) TECHNIQUES FOR MANAGING PRIORITY QUEUES AND ESCALATION CONSIDERATIONS IN USB WIRELESS COMMUNICATION SYSTEMS

(75) Inventors: Wilhelmus Diepstraten, Haghorst (NL); Aart Jan M. Geurtsen, Almere (NL); Steven E. Strauss, Orefield, PA (US); Mark Trafford, Fleetwood, PA (US)

(73) Assignee: Agere Systems Inc., Allentown, PA (US)

( * ) Notice: Subject to any disclaimer, the term of this patent is extended or adjusted under 35 U.S.C. 154(b) by 55 days.

(21) Appl. No.: 12/483,611

(22) Filed: Jun. 12, 2009

(65) Prior Publication Data
US 2009/0254685 A1 Oct. 8, 2009

Related U.S. Application Data

(63) Continuation of application No. 11/141,106, filed on Jun. 1, 2005, now abandoned.

(51) Int. Cl.
*G06F 3/00* (2006.01)
*G06F 13/00* (2006.01)

(52) U.S. Cl. .............................................. 710/33; 71/29
(58) Field of Classification Search .................... 710/29, 710/33
See application file for complete search history.

(56) References Cited

U.S. PATENT DOCUMENTS

| | | | |
|---|---|---|---|
| 6,205,150 B1 | 3/2001 | Ruszczyk | 370/412 |
| 6,601,109 B1 | 7/2003 | Bealkowski et al. | 709/250 |
| 7,035,948 B1 * | 4/2006 | Liang et al. | 710/56 |
| 7,171,505 B2 | 1/2007 | Kuhlmann et al. | 710/305 |
| 7,562,362 B1 * | 7/2009 | Paquette et al. | 718/102 |
| 7,579,809 B2 * | 8/2009 | Bowles et al. | 320/107 |
| 2002/0172205 A1 | 11/2002 | Tagore-Brage et al. | 370/395.42 |
| 2004/0092278 A1 | 5/2004 | Diepstraten et al. | 455/512 |
| 2005/0144353 A1 | 6/2005 | Long et al. | 711/100 |
| 2006/0039370 A1 | 2/2006 | Rosen et al. | 370/389 |

OTHER PUBLICATIONS

Universal Serial Bus Specification, Revision 2.0. Apr. 27, 2000, pp. 19, 372, 451, and 456.

* cited by examiner

*Primary Examiner* — Chun-Kuan Lee
*Assistant Examiner* — Zachary K Huson
(74) *Attorney, Agent, or Firm* — Mendelsohn, Drucker & Associates, P.C.; Craig M. Brown; Steve Mendelsohn (57) ABSTRACT

In one embodiment, a Universal Serial Bus (USB) system assigns a first priority level to a first USB endpoint and a second priority level that is lower than the first priority level to a second USB endpoint. The USB system has memory that stores first USB data packets corresponding to the first priority level and second USB data packets corresponding to the second priority level. The USB system also has a controller that manages transfers of (i) the first USB data packets to the first USB endpoint and (ii) the second USB data packets to the second USB endpoint. If the memory concurrently stores first and second USB data packets, then the controller determines an order for transferring the first and second USB data packets based on the second priority level being lower than the first priority level and/or detection of a starvation condition for the second endpoint.

18 Claims, 6 Drawing Sheets

TxQ PRIORITY MANAGEMENT

FIG. 6
(PRIOR ART)

TECHNIQUES FOR MANAGING PRIORITY QUEUES AND ESCALATION CONSIDERATIONS IN USB WIRELESS COMMUNICATION SYSTEMS

CROSS-REFERENCE TO RELATED APPLICATIONS

This is a continuation of co-pending application Ser. No. 11/141,106, filed on Jun. 1, 2005, the teachings of which are incorporated herein by reference in their entirety.

BACKGROUND OF THE INVENTION

1. Field of the Invention

This invention relates to queuing systems, and more particularly to priority queue methods and apparatus in communication systems such as Universal Serial Bus systems, including wireless USB systems.

2. Background of the Related Art

Generally speaking, data to be transmitted (or received) is often passed through a transmit (or receive) queue. Once in a queue, data is generally transmitted in queue order.

In systems passing various types of data (e.g., voice, data, streaming video, etc.), data passing through the queue is given different priorities in an effort to transmit the highest priority data more quickly. One technique for ensuring that data of all priorities gets transmitted (or received) at a desired speed is to provide multiple queues, one for each priority level. In systems that do not offer multiple queues to support multiple priority class traffic scenarios, a boundary condition is effectively placed on the system software or driver requiring that in the transmit direction the software apply a minimum packet queuing strategy in the available system host transmit buffers in systems that want to establish multiple-class priority traffic scenarios. (Transmit being defined as packets from local system memory that traverse through the system out onto the medium. Receive is defined as incoming packets from the medium that are demodulated and placed into system memory.) This requirement is placed on the system in an effort to prevent a potentially large delay situation when a high priority packet is passed down to the driver from the operating system. The underlying assumption or solution is that such a priority frame cannot easily be 'inserted' in the existing queue, because the potential ownership or consumption of that available buffer is unknown (i.e., may have already been relinquished to the device already).

Quality of Service (QoS) is an all-encompassing phrase that denotes that different types of communications traffic are treated differently. In telecommunications systems, QoS is typically tied to voice and video services where users, who are accustomed to using the telephone, expect high quality voice (because historically, voice was considered the money maker and therefore that traffic received priority). In data communications systems, QoS is typically tied to multi-media services. In this context, multi-media refers to data systems that handle all kinds of data streams ('streaming services') that require no 'automatic' priority or re-transmission if a data packet is somehow lost in real-time.

Telecom systems are inherently stream oriented whereas data streams are inherently 'bursty' in nature. In the circuit switched world of telecom systems, 'control' is the model solution for all problems. This 'control', however, is fine for constant rate applications like voice and video where prediction of future is easy but loses some efficiency when handling data communications. On the other hand, data systems are complex and contain mixes of data sources and sinks called applications. Breaking data streams into packets makes it possible to serve many sources efficiently by multiplexing many data streams; the price of doing this, however, is in the form of delay. In many instances the application needs to bound or at the very least minimize this delay component, whereas some applications are immune to delivery latencies (herein referred to as 'best-effort' delivery.

Wireless systems also add a second level of uncertainty (and hence potential delay) in that the traffic flows are unpredictable in no small part due to the unpredictability of the radio links as well as external interference sources. Thus, use of rigid controls to manage traffic classes in wireless LANs can cause problems.

Universal Serial Bus (USB) is a popular standard for personal computer (PC) peripheral devices because of its versatile peripheral interconnection specifications. USB not only provides simplified hardware connectors but also provides support for various bus traffic, such as isochronous and bulk transfer activities. Although the USB specifications do provide a way for users to specify the upper bound on the number of bytes for each data transfer in a 1 millisecond (mS) time frame, little work has been done within the industry to provide QoS guarantees for devices (e.g., the lower bound on the bytes for each device type in a 1 mS time frame) and a mechanism in enforcing those guarantees.

Conventional methods are generally employed at the Kernel level or via hardware to implement and reserve both "Bulk" and "Isoch" pipes for support. However, such conventional methods have several problems, including increased complexity, increased silicon area, and requiring separate and distinct buffers for each 'pipe', all of which leads to increased overall costs. Generally, too, the conventional solutions address only a 2-tiered priority strategy: high priority and non-priority data traffic classes. A key requirement in QoS-managed systems is that all devices have to implement a given model and policy and not play 'rogue'.

In present communications systems, transmit packets flow from host memory to an internal transmit buffer (e.g., a transmit packet buffer) usually under the control of a resident data movement or DMA engine, which in turn is commanded by the system driver or software. The Media Access Controller (MAC) retrieves transmit data from this packet buffer, frames it appropriately, and forwards it to a physical network layer. Likewise, receive packets flow to the MAC from the receiver. The MAC extracts packet data from surrounding header and CRC, while packet management logic determines whether each packet should be discarded, buffered, or merely decoded for network flow control and power management. Each packet which reaches the receive buffer is forwarded to the host computer via a data movement engine, again operating under host driver control. Generally, the functional implementation of on-device buffers limits the number of physical data that can be brought onto the device—i.e., packet memory is generally limited due to cost and area concerns.

Figure 6:
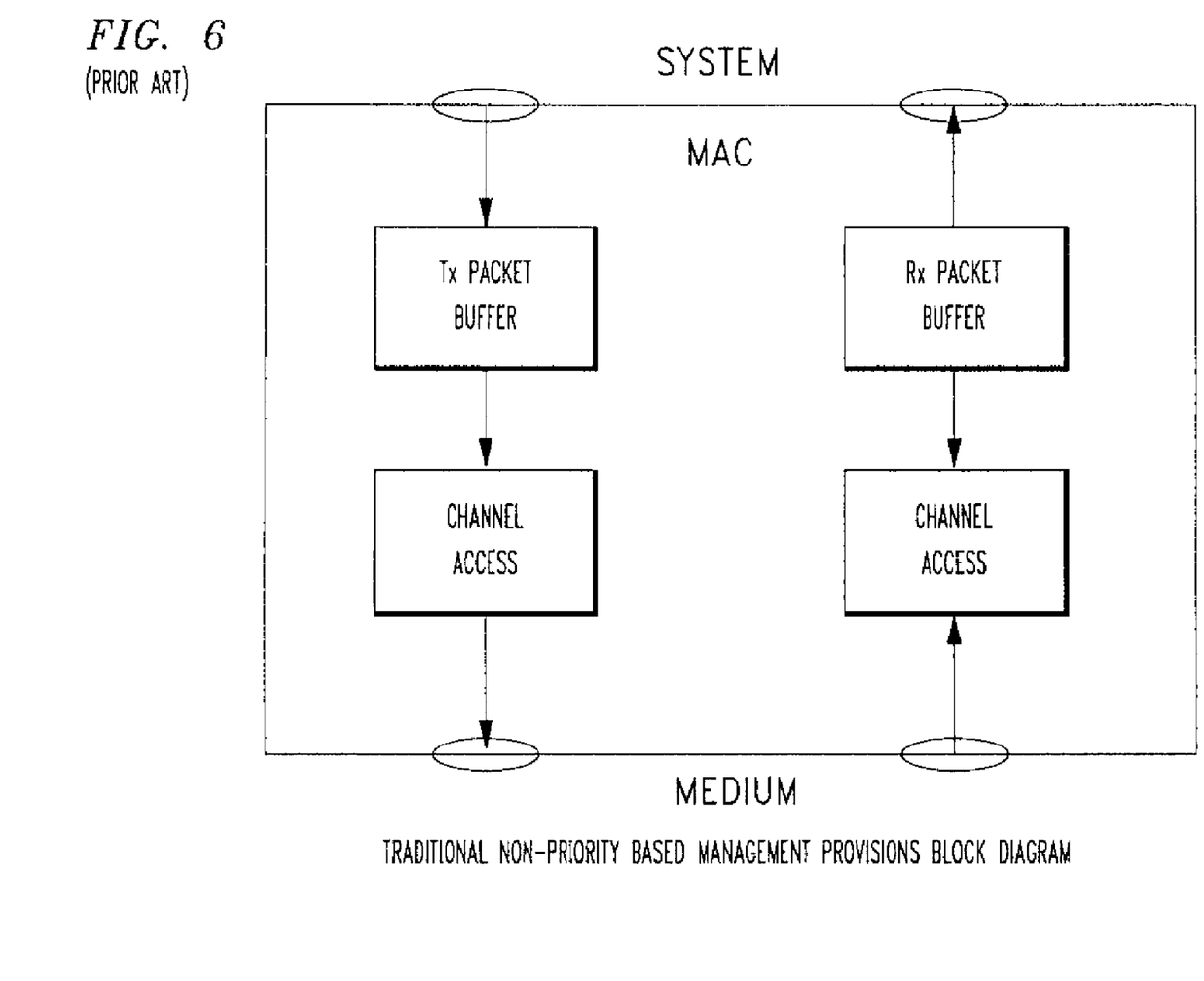
FIG. 6 shows a block diagram of a conventional non-priority based management system in a media access controller (MAC).

FIG. 6 shows a block diagram of a conventional non-priority based management system in a media access controller (MAC).

In particular, FIG. 6 shows that in these present communication systems, packets are sequentially queued and managed on a 'best-effort' basis.

In non-priority managed system offerings, generally a single queuing structure is used to buffer up packets at the system level. Using this strategy when priority traffic is available, however, a boundary condition is effectively placed on the device driver requiring that in either the Tx or Rx directions, the software apply a minimum packet queuing strategy to the available buffer. This requirement is placed on the system in an effort to prevent a potential large delay situation when a high priority packet is passed down to the driver. This underlying assumption is that such a priority frame cannot easily be 'inserted' in the existing queue, because it is unknown if the ownership of the available buffer has been relinquished to the device already.

There is a need for a fair and efficient queuing method and apparatus useful in USB type systems, particularly in wireless USB systems.

SUMMARY OF THE INVENTION

In one embodiment, the present invention is a Universal Serial Bus (USB) system for transferring (i) first USB data packets via a first USB link to a first USB endpoint and (ii) second USB data packets via a second USB link to a second USB endpoint. The USB system assigns a first priority level to the first USB endpoint and assigns a second priority level to the second USB endpoint, wherein the second priority level is lower than the first priority level. The USB system comprises memory and a controller. The memory stores the first USB data packets corresponding to the first priority level and the second USB data packets corresponding to the second priority level. The controller manages transfers of the first USB data packets to the first USB endpoint and the second USB data packets to the second USB endpoint. In particular, if the memory concurrently stores at least one first USB data packet and at least one second USB data packet, then the controller determines an order for transferring the at least one first USB data packet and the at least one second USB data packet based on the second priority level being lower than the first priority level.

In another embodiment, the present invention is a method for transferring from a Universal Serial Bus (USB) system (i) first USB data packets via a first USB link to a first USB endpoint and (ii) second USB data packets via a second USB link to a second USB endpoint. In one step, the method assigns a first priority level to the first USB endpoint and a second priority level to the second USB endpoint, wherein the second priority level is lower than the first priority level. In another step, the method stores in memory (i) the first USB data packets, which correspond to the first priority level and (ii) the second USB data packets, which correspond to the second priority level. In yet another step, the method manages transfers of (i) the first USB data packets to the first USB endpoint and (ii) the second USB data packets to the second USB endpoint. In particular, if the memory concurrently stores at least one first USB data packet and at least one second USB data packet, then the method determines an order for transferring the at least one first USB data packet and the at least one second USB data packet based on the second priority level being lower than the first priority level.

DETAILED DESCRIPTION

The invention provides a method to resolve Quality of Service issues in emerging high-speed USB-based communications systems by offering support for multiple queue management within the system. A further embodiment provides an escalation mechanism for the purposes of mitigating low priority class data starvation in these communications systems, when it becomes an issue.

Currently USB-based communications systems operate as a scheduled or reserved medium, meaning that scheduling methods are used to reserve USB bandwidth for devices in an on-demand fashion.

Figure 1:
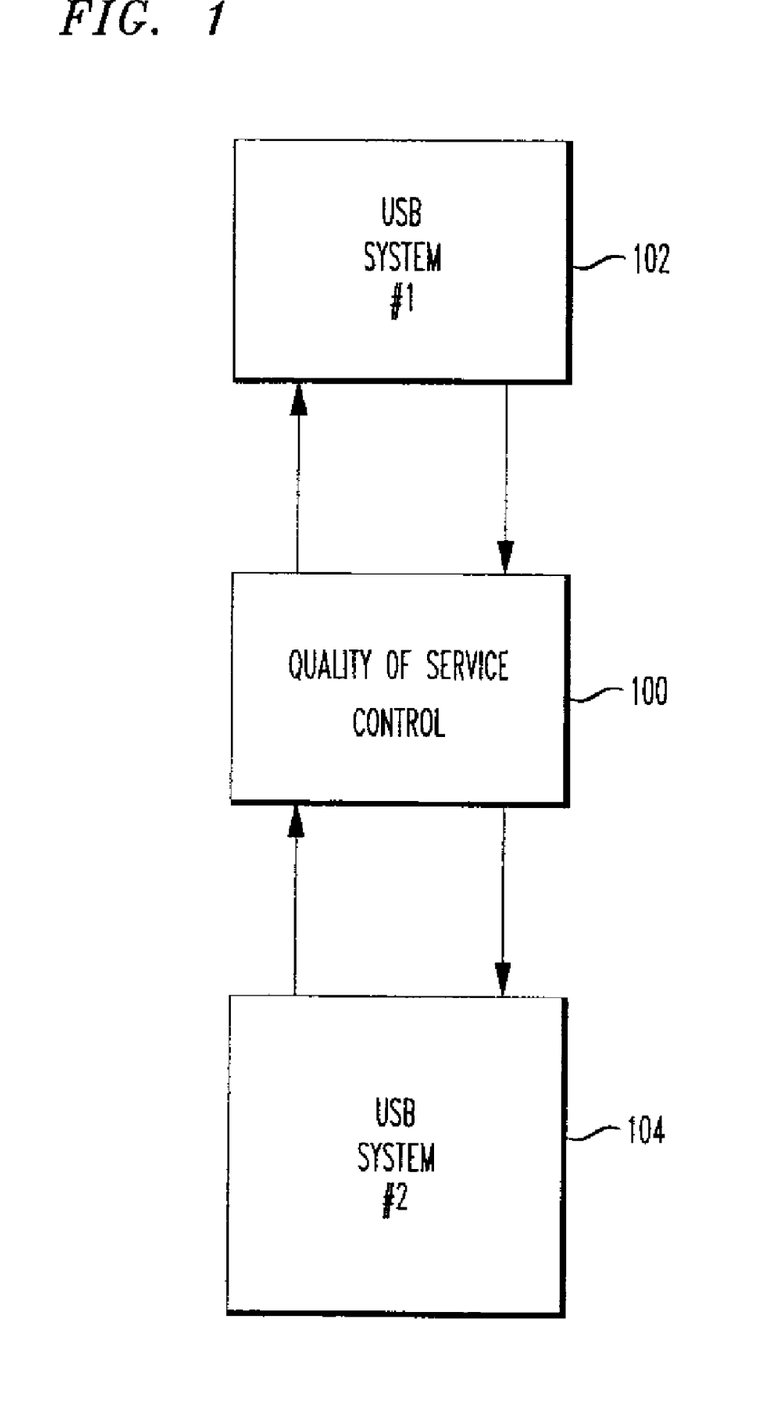
FIG. 1 shows the introduction of Quality of Service (QoS) mechanisms and facilities in Universal Serial Bus (USB) based wireless Local Area Networking (WLAN), in accordance with the principles of the present invention.

FIG. 1 shows that the present invention introduces Quality of Service (QoS) mechanisms and facilities 100 allowing communications between two USB-based wireless Local Area Networking (LAN) communication systems 102, 104. In particular, techniques are provided for managing multiple priority queues in USB-based wireless communications systems, and for ensuring that lower priority traffic is not precluded from accessing the medium during sustained periods of use by high(er) priority traffic.

In accordance with the principles of the present invention, in a USB system, a separate high or multi-priority transmit queue or queues are added to allow more low priority packets to be queued independently of a high priority traffic queue, offering significant throughput and efficiency advantages at the system level.

The present invention relates particularly to USB-centric applications, though it more generally can be applied to Quality of Service initiatives in other similar wireless Local Area Networking communication systems. The present invention adds multiple data queues into communications systems that, when used with simple control mechanisms, allow multiple classes of communications traffic with different latency and delivery objectives to be treated differently over a Universal Serial Bus (USB).

These multiple queue management mechanisms and escalation techniques can be leveraged by existing WLAN systems. Basic goals of any managed WLAN system are to: (1) retain the basic 'collision avoidance' approach used currently; (2) use adaptive flow control to keep priority traffic flowing, meaning a progressive reduction of service rate for lower classes of service as the medium load goes up; (3) use medium load feedback to drive local service rate decisions-per Service Class; and (4) use drop rate feedback to tell the application if a new 'connection' is possible. While queue management techniques can be implemented in either hardware or software, an overall advantage to offering multiple queues and using queue management and escalation techniques within a given piece of hardware can be used to increase the overall system efficiency and throughput.

The invention provides any USB-based networking system with two or more priority queuing mechanisms, and methods to flow control a lower priority traffic class on a different endpoint for the purposes of supporting Quality of Service (QoS) initiatives. It also provides any USB-based networking system having two or more priority queuing mechanisms and supporting QoS initiatives with methods to escalate a lower priority traffic class for the purposes of mitigating low priority class data starvation. In this way, lower priority class traffic is allowed to be transmitted periodically on the communication medium during sustained periods of high(er) class priority traffic transmission.

A separate or multiple high priority queue(s) allows more low priority packets to be queued independently of the high priority traffic queue. When high priority traffic is then available, a mechanism exists within the system that allows the resident on-chip data movement engine to retrieve data from the priority queues/buffers if it exists prior to servicing the best-effort queues.

In emerging systems, multiple classes of traffic having different latency and delivery objectives are being considered (e.g., See IEEE 802.11(e) SPECIFICATION). IEEE 802.11 (e) is currently a four class tier defined as (in order of lowest to highest priority):

| | |
|---|---|
| Best effort | (lowest priority) |
| Excellent effort | |
| Video (& Audio) | |
| Voice | (highest priority) |

In accordance with the present invention, the four available classes are regrouped as a three class system, leaving one priority level free to accommodate QoS and management initiatives, allowing a channel for passing low priority data at a highest priority level to prevent starvation of the low priority data.

As an example, a lowest priority class would be for 'best effort' traffic (i.e., non time-sensitive traffic), then one for priority class traffic (i.e., traffic having some latency demands), and lastly one for very high priority (i.e., voice applications). In this proposed three class system, for convenience the excellent effort and video traffic classes have been grouped together, though other combinations of otherwise conventional classes may be grouped together into three of the four class system, in accordance with the principles of the present invention.

Figure 2:
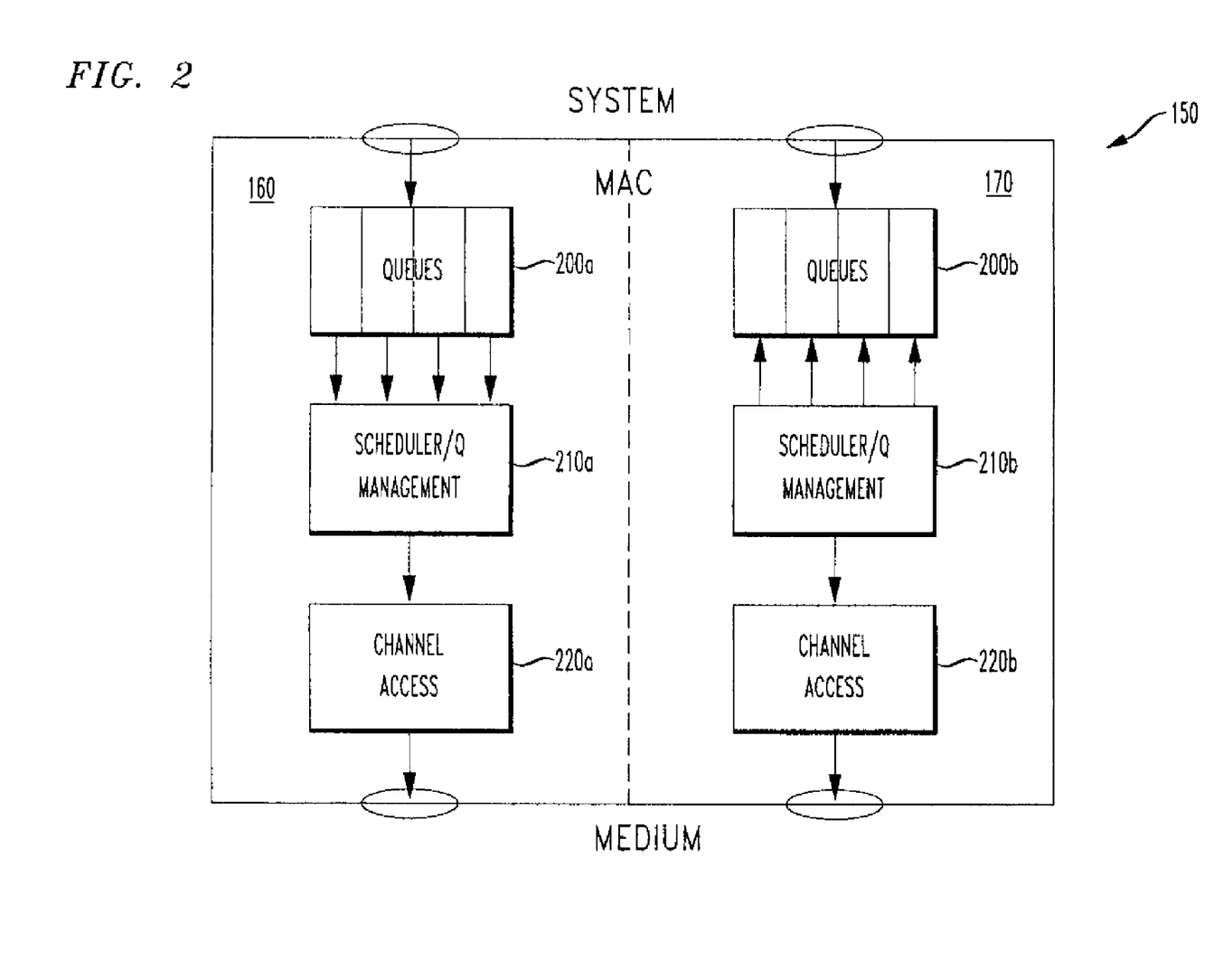
FIG. 2 shows a hardware-based priority management provision in a MAC of a USB wireless communications system, in accordance with the principles of the present invention.

FIG. 2 shows a hardware-based priority management provision in a MAC of a USB wireless communications system, in accordance with the principles of the present invention.

In particular, as shown in FIG. 2, a Media Access Controller 100 of a USB system 150 includes a transmit direction management 160 and a receive direction management 170, passing data to and from a medium (e.g., wired or wireless connection).

The transmit direction management 160 includes a plurality of queues 200a, a scheduler/queue management system 210a, and a channel access function 220a. The receive direction management 170 similarly includes a plurality of queues 200b, a scheduler/queue management system 210b, and a channel access function 220b.

The scheduler/queue management systems 210a, 210b function at two levels. At one level both transmit and receive packets are managed according to ordinary priority classes. However, importantly, the scheduler/queue management systems 210a, 210b also operate at a second level, making use of a highest priority, or bypass, queue.

Figure 3:
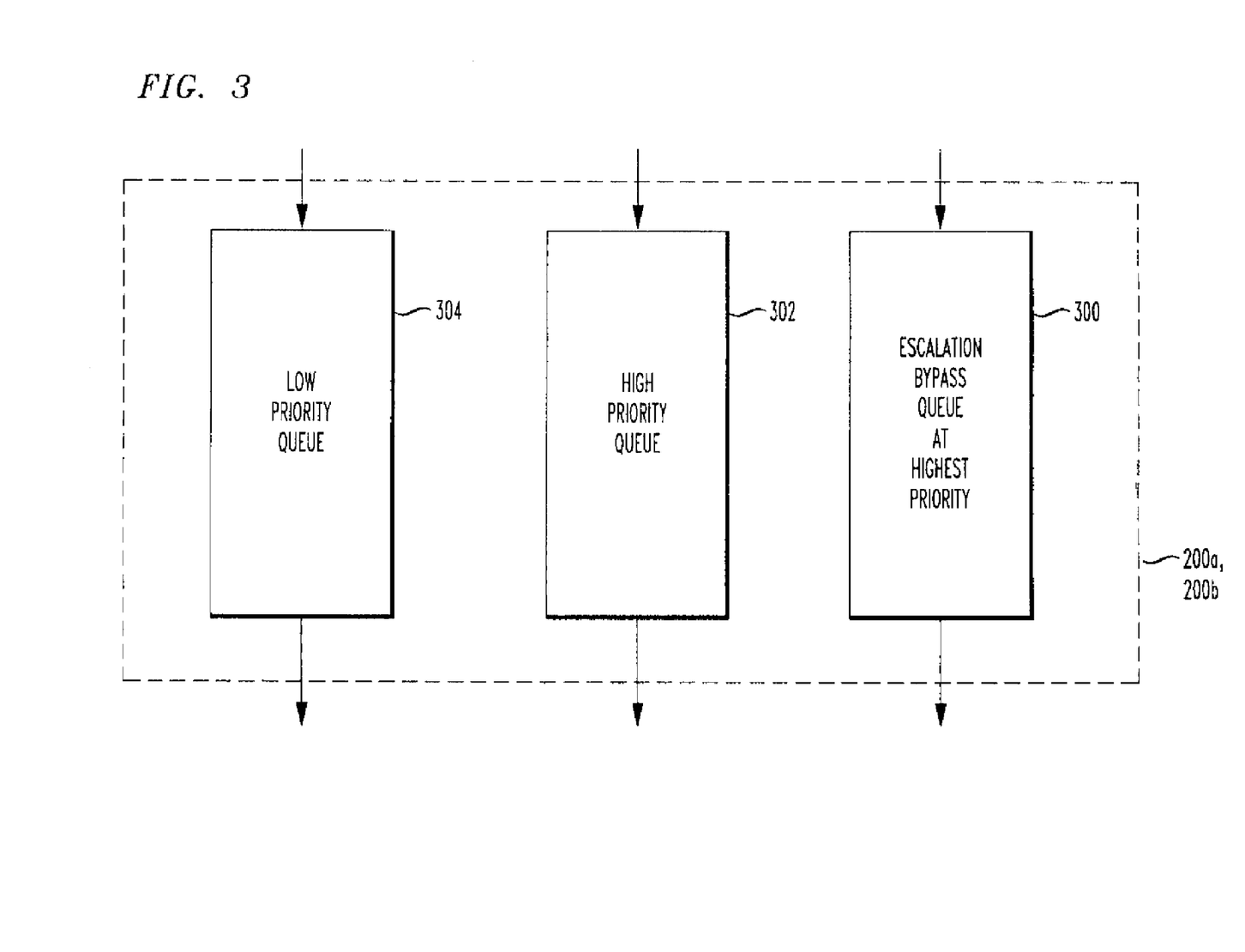
FIG. 3 depicts the inclusion of a bypass queue at a highest priority, along with regularly classed queues such as a high priority queue to a low priority queue, in accordance with the principles of the present invention.

FIG. 3 depicts the inclusion of a escalation (bypass) queue 300 at a highest priority, along with regularly classed queues such as a high priority queue 302 to a low priority queue 304. In this context, an additional register or registers is/are added to allows high(er) priority transmit packets to be queued up and sent through the network in a escalation queue 300 independent from 'best-effort' transmit packets.

Use of the escalation queue 300 allows increased system flexibility from a driver perspective as it removes otherwise conventional boundaries on minimizing the number of queued transmit packets residing in a given buffer structure. In the receive direction it is assumed that packets will be moved off of the device into the system memory quickly such that priority class management of incoming (receive) packets is not required. However, similar techniques as described to manage the transmit direction can also be leveraged at the receive level as well.

Figure 4:
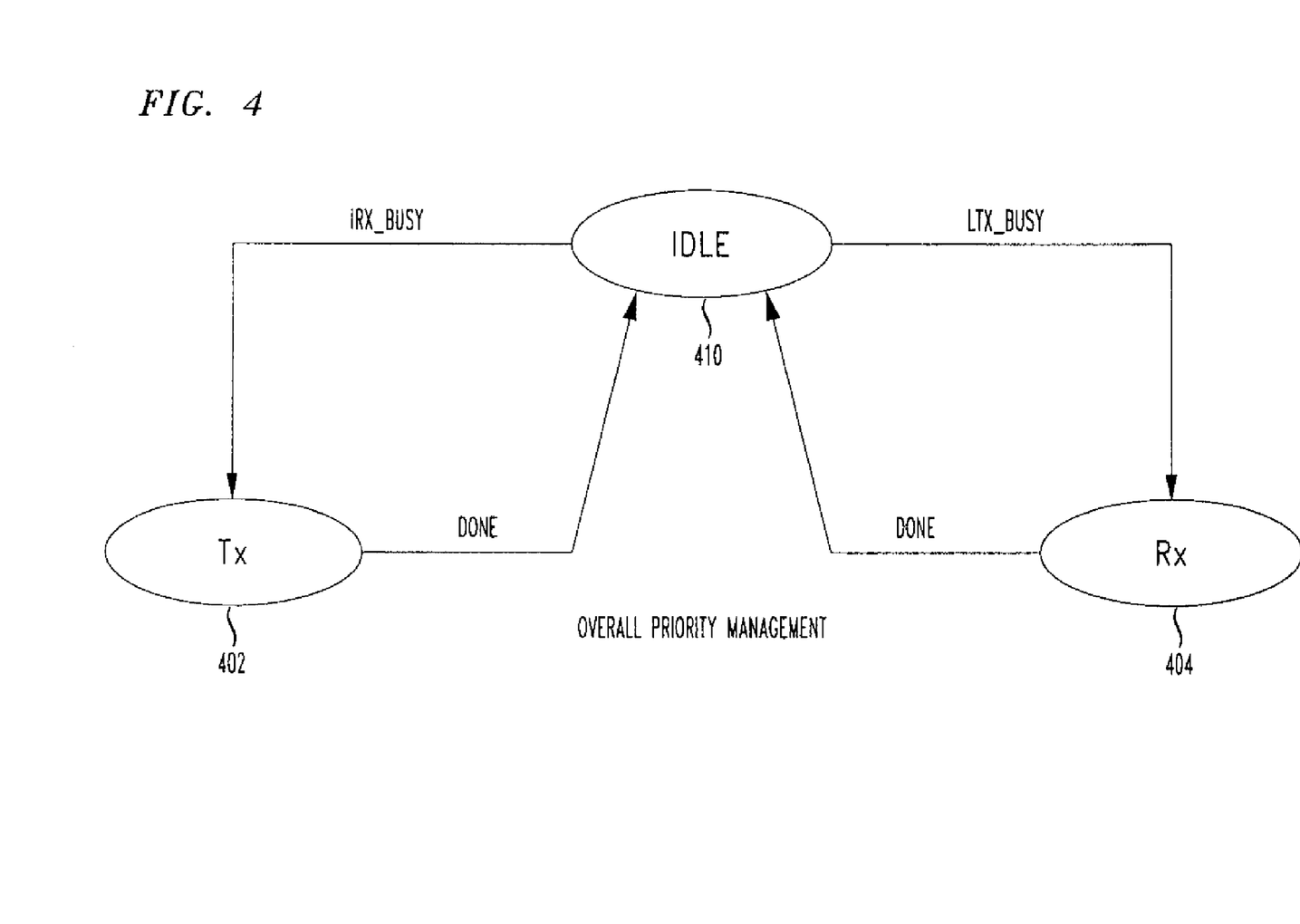
FIG. 4 shows a state diagram of overall priority management, in accordance with the principles of the present invention.

FIG. 4 shows a state diagram of overall priority management, in accordance with the principles of the present invention.

In particular, as shown in FIG. 4, when management of both transmit and receive packets needs to be considered, a simple rotating priority scheme may be implemented between a Transmit (Tx) state 402 and a Receiver (Rx) state 404. Preferably, one state (Tx state 402 or Rx state 404) does not have absolute priority over the other state (Rx state 404 or Tx state 402) which could cause a starvation condition to occur.

Given the limited size of an on-chip receive packet buffer in many applications, it is preferred for many applications that a general priority should be given to quickly bursting those packets from on-chip storage registers into system memory for processing as quickly and efficiently as possible. This is because it is appreciated that it is more difficult to flow control data that is being sent from a remote station then it is to control data that is already placed in a local system buffer.

As shown in FIG. 4, when the controller leaves either the Tx state 402 or the Rx state 404 and reaches the IDLE state 410, the state machine looks to see if another pending transfer is required and if so will arbitrate between the Transmit and Receive sections on a rotating priority basis as discussed above.

It should be noted that this constraint applies for both the Tx and Rx directions. Further, this constraint effectively results in the desired automatic rotating priority scheme without the need to explicitly handle the case that both events are active.

Upon accounting for the rotating priority scheme within either receive or transmit directions, we consider the ability to accommodate priority traffic on a per service basis (used in this context to mean either a transmit service or a receive service). First considering the transmit service side, the ability to accommodate priority traffic in the transmit direction is added into the system by supporting additional dedicated priority buffers (i.e., better than 'best effort'). This requirement removes the conventional queuing issue encountered with a single buffer or queue and allows more low priority packet queuing to occur (in its own separate and distinct buffer), while not affecting high priority traffic.

Figure 5:
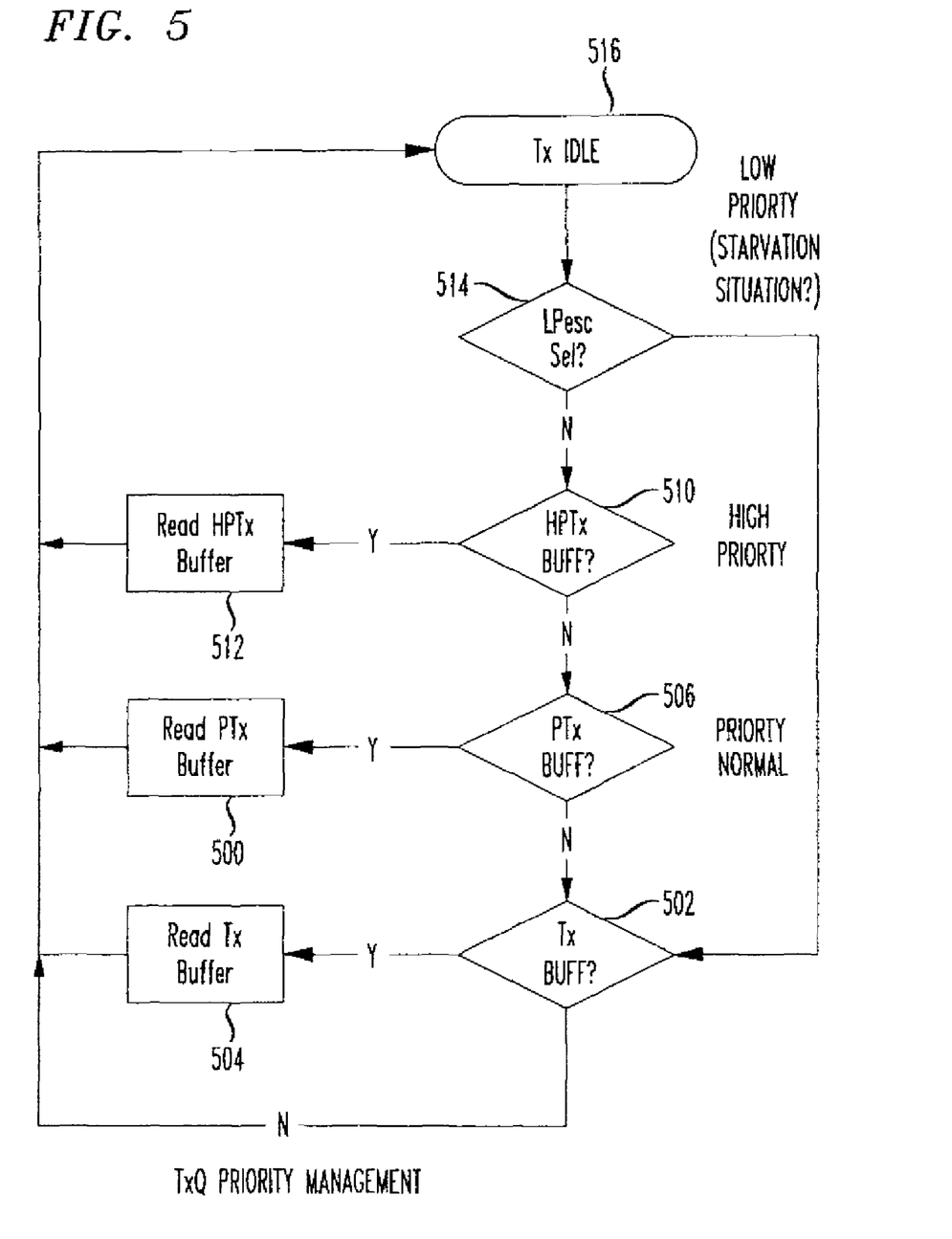
FIG. 5 is an exemplary flow chart showing a transmit queue priority management system, in accordance with the principles of the present invention.

FIG. 5 is a flow chart showing an exemplary transmit queue priority management system, in accordance with the principles of the present invention.

In particular, it is preferably that the Tx priority registers do get absolute priority over the 'best-effort' or 'normal'/best effort buffers should both be active concurrently. However, without certain policy management in place and further assuming constantly filled buffers for all traffic classes, the potential for low priority data starvation becomes an issue caused by the strict priority handling of the (video and best/excellent effort) buffers.

Handling the video and best/excellent effort buffers with a weighted round robin scheduling as depicted in FIG. 4 is one method that may be employed to ensure that data starvation does not occur.

A weighted round robin rotating priority scheme can be implemented fairly simply by servicing the queues in a given sequence. As an example sequence, the queues may be serviced in an order such as video, video, normal, video, video, normal, etc. Because of the nature of voice traffic, it can still be serviced with strict priority. However, in another embodiment of the invention provisions are added to ensure that the 'best-effort' traffic is not 'starved out' by the engine servicing these high(er) priority queues that are not as rigid as the aforementioned 'weighted round robin' scheme. These provisions may be controlled by the device firmware or scheduling mechanism by means of supplying a bit or bits in a local device register. These bits are used to indicate to the device data movement engine that the Low Priority data buffer is being starved and should be serviced first even if a pending High Priority or [Medium] Priority data packet is waiting in its respective data buffer.

As shown in FIG. 5, the priority rules remain intact and require the state machine to provide a fixed priority between a plurality of regular class service queue transmit buffers (e.g., three queues Tx, PTx, and HPTx), while at the same time preferably maintaining the rotating priority scheme between the Tx state 402 and the Rx state 404 as were shown in FIG. 4.

In the transmit queue priority management shown in step 516, the process starts in a transmit idle state.

In step 514, a register is read to determine if a low priority escape bit is set indicating that a starvation condition is active. If so, the process skips to servicing of the low priority buffer as shown by step 502, and if data is in the Tx buffer queue, then the Tx buffer is read in step 504, and the process returns to the Tx idle state of step 516. If no data is in the Tx buffer queue, then the process simply returns to the Tx idle state of step 516.

If the low priority escape bit is not set in step 514, then the process continues to monitor if data is in the highest priority queue (in this case a high priority transmit buffer (HPTx) in step 510. If so, the HPTx buffer is read in step 512, and the process returns to the idle state in step 516. If not, the process continues to monitor the next priority queue lower than the previous queue, as shown in step 506. If data is in the next priority queue (e.g., PTx buffer), then the PTx buffer is read in step 508, and the process continues to the idle state shown in step 516. If not, the process continues to the next lowest priority queue shown in step 502, reading data from the Tx buffer in step 504, and returning to the Tx idle state in step 516.

The techniques and apparatus provided by the present invention are now discussed with respect to the Universal Serial Bus (USB) interface.

USB supports a polling based protocol implying that the host issues messages that inform the functions (which in this context is attached hardware-based devices) that they can send data upstream, or prepare to receive information from the [USB] host. These messages are called token packets. The only control functions have over data delivery is a negative acknowledgement (NAK) reply. A NAK means that the function is not capable sending or receiving the requested data, and the host should try the request again later. Data delivery is guaranteed through the use of standard CRC and resend mechanisms.

Endpoints and pipes are the basic constructs of any communication link between a USB host, hub, or function. Endpoints are the termination points of unidirectional communication paths, which can be uniquely referenced by USB devices using a device address, an endpoint number, and a dataflow direction. Pipes are logical links from client software (running on the PC) and endpoints of USB devices. The idea here is that a number of Endpoints are logically collected into pipes. Pipes provide some unified interface to a function.

A function has at least one pipe, called the default control pipe. This pipe is created when a USB device is connected to the host and is properly detected. This control pipe is used to configure the USB device, and to carry any control requests made by either the host or the function. This default pipe always uses two endpoints (one in each direction) and these two endpoints are given endpoint number 0 (zero). Pipes can be configured to use a structured packet format or use a unidirectional, unstructured stream. Pipes that use the structured packet format are called message pipes, while pipes that ship unstructured streaming data are called stream pipes.

Handshake packets are used for flow control and used as responses to various requests. A handshake packet may be an acknowledgement (ACK), a NAK, or a STALL. ACKs are sent by either the host controller or the function when data packets are received correctly. NAKs indicate that a function did not receive a data packet correctly in response to an OUT request, or that the function has no data (or is not able to send data) in response to an IN request.

In general, USB does not support priority mechanisms within the system-traffic to multiple endpoints is happening concurrently, and this traffic will interleave with other transfers on the USB. USB is designed to support many types of devices, such as human interface devices (e.g., key-board and moust), block devices (e.g., disks), communication transceivers, stereo speakers, video cameras, etc. The data transfer modes on USB could be classified into four categories: isochronous transfer, interrupt transfer, control transfer, and bulk transfer.

Isochronous transfer and interrupt transfer are periodic data transfers, while control transfer and bulk transfer each introduce aperiodic bus activities. Different types of devices require different bandwidths and ways to interact with USB host controllers, where a host controller manages the bandwidth of a USB bus. For example, a human interface device (HID) demands a periodic but light bus workload. A storage device requires a best-effort service from the corresponding host controller. On the other hand, an operating system must manage a number of devices through USB simultaneously, and devices would compete for a limited bus bandwidth. How to properly manage USB bandwidth is of paramount importance if reasonable QoS requirements are, indeed, considered.

In an effort to support a multi-tiered (i.e., more than 2) priority strategy, a USB system architecture is realized that negotiates for N endpoint (EP) resources where N is the number of desired traffic classes to support. To minimize silicon area, the architecture considers a single data buffer for all of the N bulk endpoints. Having multiple bulk endpoints sharing the same memory resources allows separation of management and data transfers, and also allows implementation of priority across the USB interface.

In a four priority class system, four distinct end points can be negotiated within the system. Mapping of priority structures to dedicated endpoints provides the possibility to implement QoS.

Table 1 shows endpoint internal priorities with respect to traffic types.

TABLE 1

| Endpoint # | Priority | Traffic Type |
|---|---|---|
| 1 | 1 | USB messages containing management data |
| 3 | 2 | Interrupt in messages towards the host |
| 7 | 3 | USB mesg containing frame structure w/priority 3 traffic |
| 6 | 4 | USB mesg containing frame structure w/priority 4 traffic |
| 5 | 5 | USB mesg containing frame structure w/priority 5 traffic |
| 4 | 6 | USB mesg containing frame structure w/priority 6 traffic |

The architecture interprets the priority classes within the table such that the lower the priority value is in Table 1, the higher the traffic priority. Note that the priority of the endpoints numbers [7:4] as defined in Table 1 may be ordered in any desired manner.

Given this unified data buffer structure, there can be only one transfer active to the device on the USB at any given time. Accordingly, a method or methods to 'flow control' or block additional data requests on disparate endpoints is required. To allow sharing, the architecture needs additional control over what is accepted in the unified buffer.

Some very simple rules are employed by a resident controller to ensure proper handling of multiple priority channels in a USB-based system. In its simplest embodiment, this controller is an arbiter that accepts requests and issues grants to agents desiring access to the unified buffer structure.

Rule (1): Packets coming in from the medium will be sent to the system as soon as possible. Device to host packets come in sequentially and can use a single bulk endpoint for data transfers.

Rule (2): An incoming packet (in this context, incoming refers to the host-to-device, or in USB parlance 'OUT' pipes) should be completed in its entirety prior to acceptance of any other data on another endpoint. An incoming packet can be contained in a single USB data transfer/cycle or spread out over multiple cycles. Given the unified buffer structure for all bulk endpoints, there can be only one transfer active at a given time. Any interleaved transfer to other endpoints will consequently be 'flow controlled' automatically because there is no buffer resource available to receive these OUT frames.

In USB, this is referred to as: NACK or NYET and the actual response is dependent on USB mode. For USB 1.1: NACKs are used, for USB 2.0 HS: NYETs shall be used.

The controller interleaves request frames for endpoints that have been NYET'd in a round robin fashion, while doing the OUT transfer to one of the endpoints.

The controller maintains knowledge of what endpoint has traffic pending, and further maintains knowledge of when a multi-fragment packet is pending and completed. A single fragment packet can be handled easily with very little additional effort. A multi-fragment packet requires that the resident controller block the buffer resource for other requesting endpoints until completed.

The controller has the ability to quickly parse or delimit the multi-fragment frames.

When the controller knows that the interface is receiving a frame structure over one of the USB EP[3:6] structures (through an 'agent' request and then the subsequent grant), it remembers all incoming requests for EPs[3:6]. Whenever the controller receives a request from a higher priority class endpoint, than the priority class of the endpoint it is currently serving, it shall serve the highest priority directly after completion of the current transfer in the current frame structure. Furthermore, when the controller is receiving a frame structure over one of the EPs [3:6], it starts to NAK/NYET the endpoint as soon as it received the whole frame structure is received over that endpoint. By capturing the request frames that could not be acknowledged due to unavailability of a buffer, a given implementation can use this data to prioritize the next request. In this context, the controller will acknowledge the highest priority (i.e., non-blocked) request only after the OUT buffer resource becomes available.

To support the priority mechanisms of the present invention, including the interjection of an escalation (i.e., bypass) queue at a highest priority, it is preferred that a 'request history' buffer be maintained. It is also preferred that any subsequent request that is lower priority then the highest priority captured in the history buffer be blocked. Moreover, it is also preferred that the request be cleared when serviced.

In a further aspect of the present invention, the architecture is enhanced to include an accessible register in which a higher order entity (like an on-board co-processor or arbitration request counting logic) can make settings that enable the USB host interface logic controller with the capability to block USB packets (via NAK/NYET mechanisms) for certain endpoints as a function of frame structures waiting in the incoming data queues.

In this aspect, the architecture is able to block an endpoint temporarily. This is valuable to ensure that memory buffers remain available for other priorities as well as allow an endpoint block to occur when enough frames are in the queue for a given priority level. This consideration ensures that buffers will still remain available for other priorities' slots.

As soon as various queues do empty to an acceptable level (due to frames being transmitted), the higher order entity may then release the block by toggling a bit in a support register. Note that this arbitration mechanism is consistent with the low priority escalation mechanism described earlier.

Currently for the USB bus, three maximum data rates have been defined: 1.5 Mbps (USB 2.0 Low Speed), 12 Mbps (USB 2.0 Full Speed), and 480 Mbps (USB 2.0 High Speed). When a device is in one of these modes, the supported data rate has to be shared between all devices that are connected to the host via a specific USB. This mode is likely required for the higher data rates currently being envisioned for wireless data communications systems. However, the techniques provided within this paper do not preclude the use of the lower speed and earlier generation USB interfaces (referred to as USB 1.1).

The invention can be implemented in a fairly straight forward manner into existing WLAN systems in general by offering support for multiple queue management within the system with the ability to escalate a lower-priority entity during sustained periods of higher priority traffic.

It is anticipated that due to the cost effectiveness of emerging communication systems (i.e., wireless LAN solutions), multiple devices in consumer space will become linked to high speed home networked devices and computers for the purposes of automation and data sharing. Accordingly, the ability to provide a simple real-time method to support multiple traffic classes becomes extremely valuable, especially in emerging applications where Quality of Service (QoS) objectives are highly desired. Furthermore, escalation mechanisms that mitigate low priority class data starvation in these communications systems using a bypass queue adds value to these systems.

The present invention builds on the proven success of the current 802.11 MAC, and can be retrofitted into existing designs. It also adds QoS features that are adaptive and robust, and fits well with existing traffic models. It also maintains efficient channel filling of the basic wireless MAC by filling empty service levels.

Though described with respect to a USB communications system, the principles of the present invention relates to other communications systems that support multiple packet queue management, e.g., 802.11(e) conforming systems. In accordance with the QoS initiatives and/or methods to escalate a lower priority traffic class for the purposes of mitigating low priority class data starvation of the present invention, and QoS initiatives by using a single data buffer with management techniques to temporarily block or flow control data on a lower priority channel.

While the invention has been described with reference to the exemplary embodiments thereof, those skilled in the art will be able to make various modifications to the described embodiments of the invention without departing from the true spirit and scope of the invention.

We claim:

1. A Universal Serial Bus (USB) system for transferring (i) first USB data packets via a first USB link to a first USB endpoint and (ii) second USB data packets via a second USB link to a second USB endpoint, wherein:
the USB system:
assigns a first priority level to the first USB endpoint; and
assigns a second priority level to the second USB endpoint, wherein the second priority level is lower than the first priority level; and
the USB system comprises:
memory that stores the first USB data packets corresponding to the first priority level and the second USB data packets corresponding to the second priority level; and
a controller that manages transfers of the first USB data packets to the first USB endpoint and the second USB data packets to the second USB endpoint, wherein, if the memory concurrently stores at least one first USB data packet and at least one second USB data packet, then the controller determines an order for transferring the at least one first USB data packet and the at least one second USB data packet based on the second priority level being lower than the first priority level, wherein:
the controller further determines the order for transferring the at least one first USB data packet and the at least one second USB data packet based on a detection of a data starvation condition for the second endpoint; and
if the data starvation condition is detected, then the controller determines to transfer the at least one second USB data packet before transferring the at least one first USB data packet even though the second priority level is lower than the first priority level.

2. The invention of claim 1, wherein, if the data starvation condition is not detected, then the controller determines to transfer the at least one first USB data packet before transferring the at least one second USB data packet because the second priority level is lower than the first priority level.

3. The invention of claim 1, wherein the USB system is a wireless USB system.

4. The invention of claim 1, wherein:
the USB system transfers third USB data packets via a third USB link to a third USB endpoint;
the USB system assigns a third priority level to the third USB endpoint, wherein the third priority level is lower than the first priority level and higher than the second priority level;
the memory is adapted to store the third USB data packets corresponding to the third priority level; and
the controller further manages transfers of the third USB data packets to the third USB endpoint, wherein:
if the memory concurrently stores the at least one first USB data packet and at least one third USB data packet, then the controller determines an order for transferring the at least one first USB data packet and the at least one third USB data packet based on the third priority level being lower than the first priority level; and
if the memory concurrently stores the at least one third USB data packet and the at least one second USB data packet, then the controller determines an order for transferring the at least one third USB data packet and the at least one second USB data packet based on the second priority level being lower than the third priority level.

5. The invention of claim 1, wherein the controller manages transfers of (i) the first USB data packets to the first USB endpoint and (ii) the second USB data packets to the second USB endpoint to support quality of service requirements.

6. The invention of claim 1, wherein the first and second endpoints are part of a single device connected to the USB system.

7. The invention of claim 1, wherein:
each of the first and second USB endpoints is a termination point of a unidirectional communication path that can be uniquely referenced by the USB system using a device address, an endpoint number, and a dataflow direction; and
each of the first and second USB endpoints conform to a USB standard.

8. A controller-implemented method for transferring from a Universal Serial Bus (USB) system (i) first USB data packets via a first USB link to a first USB endpoint and (ii) second USB data packets via a second USB link to a second USB endpoint, the method comprising:
(a) the controller assigning a first priority level to the first USB endpoint and a second priority level to the second USB endpoint, wherein the second priority level is lower than the first priority level; and
(b) the controller storing the first USB data packets corresponding to the first priority level and the second USB data packets corresponding to the second priority level in memory; and
(c) the controller managing transfers of the first USB data packets to the first USB endpoint and the second USB data packets to the second USB endpoint, wherein, if the memory concurrently stores at least one first USB data packet and at least one second USB data packet, then the method determines an order for transferring the at least one first USB data packet and the at least one second USB data packet based on the second priority level being lower than the first priority level, wherein:
the method further comprises the controller determining the order for transferring the at least one first USB data packet and the at least one second USB data packet based on a detection of a data starvation condition for the second endpoint; and
if the data starvation condition is detected, then the controller determines to transfer the at least one second USB data packet before transferring the at least one first USB data packet even though the second priority level is lower than the first priority level.

9. The invention of claim 8, wherein, if the data starvation condition is not detected, then the method determines to transfer the at least one first USB data packet before transferring the at least one second USB data packet because the second priority level is lower than the first priority level.

10. The invention of claim 8, wherein the USB system is a wireless USB system.

11. The invention of claim 8, wherein:
the method further transfers third USB data packets from the USB system via a third USB link to a third USB endpoint;
step (a) further comprises assigning a third priority level to the third USB endpoint, wherein the third priority level is lower than the first priority level and higher than the second priority level;
step (b) further comprises storing the third USB data packets corresponding to the third priority level in the memory; and
step (c) further comprises managing transfers of the third USB data packets to the third USB endpoint, wherein:
if the memory concurrently stores the at least one first USB data packet and at least one third USB data packet, then the controller determines an order for transferring the at least one first USB data packet and the at least one third USB data packet based on the third priority level being lower than the first priority level; and
if the memory concurrently stores the at least one third USB data packet and the at least one second USB data packet, then the controller determines an order for transferring the at least one third USB data packet and the at least one second USB data packet based on the second priority level being lower than the third priority level.

12. The invention of claim 8, wherein the method manages transfers of (i) the first USB data packets to the first USB endpoint and (ii) the second USB data packets to the second USB endpoint to support quality of service requirements.

13. The invention of claim 8, wherein the first and second endpoints are part of a single device connected to the USB system.

14. The invention of claim 8, wherein:
each of the first and second USB endpoints is a termination point of a unidirectional communication path that can be uniquely referenced by the USB system using a device address, an endpoint number, and a dataflow direction; and
each of the first and second USB endpoints conform to a USB standard.

15. The invention of claim 1, wherein the controller is adapted to detect automatically the data starvation condition for the second endpoint.

16. The invention of claim 8, wherein the method further comprises the controller detecting automatically the data starvation condition for the second endpoint.

17. The invention of claim 1, wherein the first priority level and the second priority level are not changed.

18. The invention of claim 8, wherein the first priority level and the second priority level are not changed.

* * * * *